May 24, 1960

C. ADLER, JR 2,938,192

BEACON LIGHTS

Filed May 24, 1956

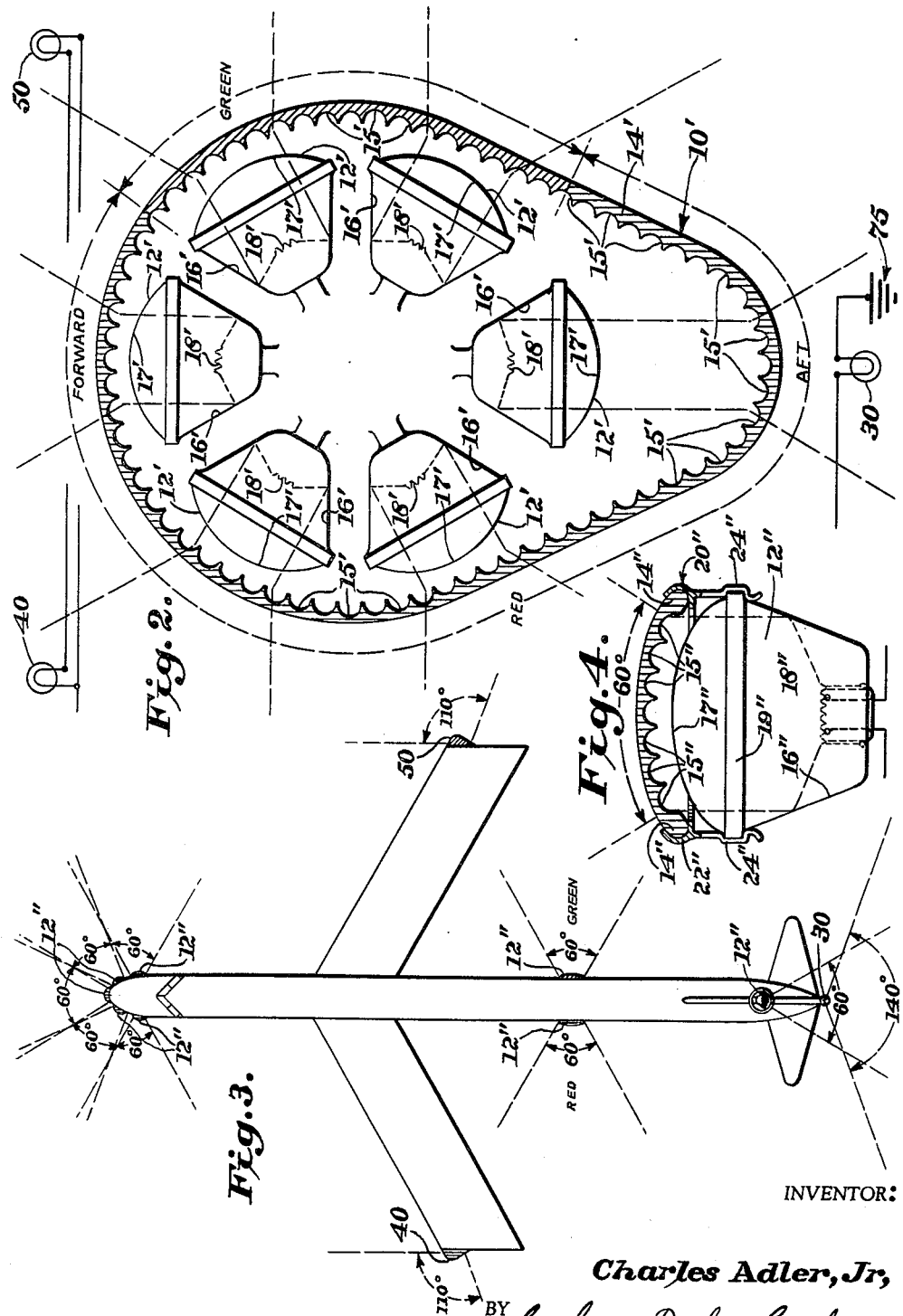

United States Patent Office 2,938,192
Patented May 24, 1960

2,938,192
BEACON LIGHTS
Charles Adler, Jr., 1417 N. Charles St., Baltimore 1, Md.
Filed May 24, 1956, Ser. No. 587,139
12 Claims. (Cl. 340—25)

The present invention relates to new and useful improvements in external signalling and identification lights, particularly adapted for airplanes. More specifically, it relates to new and improved aircraft signalling systems including a beacon or anti-collision light involving no moving parts.

The signalling systems for aircraft, that are presently employed, usually include flashing colored position lights on the wing tips and tail, and a revolving beacon or anti-collision light having an axis of revolution perpendicularly disposed on the longitudinal axis of the aircraft. In these systems, during the flight of the aircraft, the revolving beams emitted from the beacon light are often reflected, in sweeping angles, from clouds and other atmospheric formations back in the direction of the aircraft. If it is necessary for the aircraft to fly through cloud formations for a considerable time, the continual and repeated reflections from the revolving beacon lights have in some cases caused pilots to become dizzy. This dizziness or vertigo may become so intense and severe that the pilot completely loses his equilibrium and coordination, and consequently is unable to control the aircraft. Serious accidents have occurred as a result of this.

It is, therefore, an important object of this invention to provide a new and improved aircraft anti-collision or beacon light assembly emitting stationary, and not revolving, beams of light to eliminate the danger of pilot vertigo caused by revolving beacons.

Another object of this invention is to provide an aircraft beacon light assembly, emitting stationary beams of light, which is effective to distribute the emitted beams through a horizontal angular spread of 360° so as to be visible by a ground or air observer located at any lateral position around the aircraft.

A further object is to provide an aircraft beacon light assembly, of the type under consideration, that may be altered by the pilot during flight to prevent any beams of light, issuing from the assembly, from being projected forwardly along the longitudinal axis of the aircraft, in the direction of flight.

Another disadvantage of the revolving anti-collision or beacon lights, currently in use, is the relatively long period of darkness involved between the sweeps of each revolving beam. Such relatively long periods of darkness render it difficult to make rapid and accurate determinations of the position and direction of flight of the aircraft.

It is, accordingly, an additional object of this invention to provide a novel beacon light assembly having longer periods of illumination than darkness, in all directions around the aircraft.

Yet another object is to provide a novel electrical arrangement for an aircraft beacon light assembly, of the type under consideration, in combination with stationary wing tip and tail lights.

Other objects and advantages of the present invention will be made more apparent from the following description and accompanying drawings, in which:

Figure 1 is a plan view of an aircraft beacon light assembly, constituting a preferred embodiment of this invention, and showing, diagrammatically, an electrical circuit for connecting the beacon light assembly with stationary wing tip and tail lights;

Figure 2 is a plan view of an aircraft beacon light assembly, constituting another embodiment of this invention, and intended to be connected with the stationary wing tip and tail lights in the same manner as the beacon light assembly of Figure 1;

Figure 3 is a plan view of an aircraft beacon assembly, constituting still another embodiment of this invention, and showing the manner in which the lamps of the beacon assembly and the wing tip and tail lights are disposed on an aircraft; and Figure 4 is a plan view of a lamp and lens arrangement adapted to be used in the beacon light assembly of Figure 3.

Referring now to the drawings, and in particular to Figure 1, a preferred embodiment of this invention comprises an anti-collision or beacon light assembly 10, intended to be mounted on the fuselage of an aircraft (not shown) along the longitudinal axis thereof, and it also comprises a tail light 30 and colored wing tip lights 40, 50 mounted on the aircraft. The beacon light assembly 10 preferably includes a plurality of lamps 12 arranged in juxtaposed relation in a circle to emit beams of light projecting radially outwardly from the circle. A transparent cover glass 14 encloses the beacon lamps 12, and preferably has a streamlined, oval shape in horizontal section. Each beacon lamp 12 includes a glass bulb having a relatively shallow parabolic reflector 16 formed, for example, as by deposition of a reflective or silver coating on the glass bulb. A filament 18 is arranged within each beacon lamp so as to be disposed externally of the parabolic area comprehended by the reflectors 16. That is, the filaments 18 preferably are disposed on the axes of the reflectors at a point at or near the focal points of the reflectors; and the filament 18, reflector 16 and glass bulb of each lamp cooperate to emit a beam of light having approximately a 60° horizontal angular distribution and, as shown, six of these lamps are equally spaced along the circumference of the circle which they define. In this manner, the beams of light issuing from the lamps will combine to produce a 360° horizontal angular coverage around the beacon assembly. By reason of this arrangement, the beacon assembly will emit beams of light visible from any lateral point around the aircraft. The lamps 12 which are arranged on the longitudinal axis of the beacon assembly will be referred to hereinafter as beacon axis lamps while the other beacon lamps will be referred to as beacon side lamps. The beam of light emitted from each beacon lamp preferably is narrow and projects in a substantially horizontal direction. A suitable mounting base (not shown) will be provided for the beacon light assembly 10 whereby the latter may be mounted along the longitudinal axis of the aircraft, either on the upper or lower surface of the fuselage, or on top of the dorsal fin. In most instances, the beacon light assembly will be mounted on top of the dorsal fin of the aircraft since this is usually the uppermost structure on the aircraft and hence there will be no obstruction of the horizontal beacon beams. Both the cover glass 14 and each beacon lamp 12 are mounted in stationary positions on the mounting base, with the tapering portion of the oval shaped cover glass converging in a rearward direction of the aircraft to reduce wind resistance.

The tail light 30 is mounted on the aircraft to emit a white or colorless beam of light projecting rearwardly from the aircraft and having a horizontal angular spread of approximately 140° (as the tail light in Figure 3) and having a vertical angular spread of 180°. The wing tip lights 40, 50 are both provided with a colored light transmitting lens, one of these lenses being red and the other green. Each of these lights is designed to emit a beam of light having a horizontal angular spread of approximately 110° (as the wing tip light in Figure 3) to combine with the tail light 30 to produce a horizontal coverage of 360° around the aircraft for the wing and tail lights. The beam of light emitted from the wing tip lights also has a vertical spread of approximately 180° whereby the beams of light emitted from the wing tip and tail lights will be visible from a point directly above or directly below the aircraft. The red wing tip light may be disposed on the left side of the aircraft and the green wing tip light on the right side, as indicated in Figure 1. In this connection, the beacon lamps 12 each preferably include a colored light transmitting member or lens 22 disposed adjacent thereto impart a distinctive color to the beams of light emitted from these lamps. These light transmitting members completely enclose the lamps 12 and may all be red or may be red on the same side of the aircraft as the red wing tip light, green on the same side of the aircraft as the green wing tip light, and red for the beacon axis lamps. By virtue of this latter arrangement, an observer on the port or left side of the aircraft will see red beams of light from both the wing tip and the beacon assembly, while an observer on the starboard or right side of the aircraft will see green beams of light from the wing and beacon assembly, to clearly indicate to the observer the side of the plane being observed and thereby facilitate the determination of the direction of flight of the aircraft. If desired, the light transmitting members 22 may be omitted and the cover glass 14 colored red to produce the colored beams of light.

A battery 26 or other suitable source of electrical energy having a ground 28 is provided for the beacon light assembly and the wing tip and tail lights and is connected thereto in the following manner. A lead 32 runs from the battery to a main switch 34. Leads 36, 38 branch off in parallel from the switch 34. Leads 42, 44 are connected in parallel with lead 36, to dispose the beacon axis lamps in one parallel branch, with the beacon side lamps, the tail light, and the wing tip lights each in a separate parallel branch as will be described hereinbelow. A switch 46 is provided in the lead 42, the latter extending within the beacon assembly and being connected to lead wires 52, 54 which extend to the front and rear beacon axis lamps. Leads 56, 58 connect the front and rear beacon lamps to a suitable ground 60, as shown. Also, a normally closed switch 62 may be provided in the lead 52 extending to the front beacon lamp 12 for a purpose hereinafter to be set forth. Another switch 64 is provided in the lead 44, the latter branching into a lead 66 for the tail light, a lead 68 for the wing tip lights and a lead 70 for the beacon assembly side lamps. The wing tip lights 40, 50 are connected in parallel by means of wires 69, 71 branching from lead 68 and grounds 73, 75 are provided for the wing and tail lights, respectively. The lead 70 is connected to lead wires 72, 74, 76, 78; the latter being arranged in parallel and leading to the various beacon side lamps which in turn are connected to the ground 60 as shown.

An electric motor 80 is connected to the battery 26 by the lead 38 and is grounded as at 82. A cam wheel or plate 84, preferably having a pair of diametrically opposed lobes 85 thereon and made of an electrically non-conducting material is drivingly connected to the motor 80 to be rotated thereby and is positioned adjacent the switches 46, 64. The switches 46, 64 may be identical in structure and each includes a stationary arm 86 and a movable arm 88, both preferably made of a resilient strip of metal, the latter being resiliently urged against the former to normally close contacts on these arms for maintaining the switches closed. The movable arm terminates in a crook or bent portion 90 and these switches are arranged so that the movable arm 88 of switch 46 is disposed at a right angle to the movable arm 88 of switch 64 whereby as the cam plate rotates, in a clockwise direction as viewed in Figure 1, one of the diametrically opposed lobes 85 thereon will first engage the movable arm of switch 46 to open the latter and after rotating 90° from this position then said one of said lobes will engage and open the movable arm of switch 64. Immediately upon disengagement of the lobes 85 from the movable arm crooks 90, the movable arms 88 will be moved back to a switch closing position. It should be obvious that at no time will the switches 46, 64 both be opened simultaneously, so that with the main switch 34 closed, the beacon axis lamps will be extinguished when one of the cam lobes 85 opens the switch 46, cutting off the flow of current through lead 42 while the remaining lights in the system are lighted; and when the cam rotates 90° from this position, the switch 64 will be opened by the same cam lobe to cut off the flow of current through lead 44, thereby extinguishing the tail light, the wing tip lights, and the beacon side lamps simultaneously while the beacon axis lamps are burning. The flasher motor 80 and cam lobes 85 are designed to keep the switches 46, 64 opened for a relatively short period of time, for example 0.4 second, while they will be closed for a considerably longer time. The extinguishing and relighting of the various beacon lamps and the wing and tail lights will thus be seen to be periodic with the periods of darkness being very brief and with certain of these lights and lamps being extinguished every quarter turn of the cam 84 to impart a distinctive and attention-arresting flashing sequence to the signalling system.

The beacon lamps 12, therefore, take the place of the conventional revolving or rotating beacon light and involve no moving parts. Consequently, no distracting and distributing angular sweeps of the beams of light emitted therefrom are produced. If desired, the front or forward beacon axis lamp may be extinguished by opening the switch 62 so that the pilot will not be distracted by any beam of light projecting forwardly from the beacon assembly 10. This would be desirable, for example, if the aircraft were travelling through heavy cloudy formations where such a forwardly projected flashing beam of light might be continually reflected from these clouds into the cockpit and create an annoying and disturbing influence for the pilot.

Additional lobes may be formed on the cam 84 to vary the relationship between the periods of illumination of the beacon lamps to the periods of darkness, and the tail and wing tip lights may be directly connected to the battery 26 so that they burn continuously while the beacon lamps flash; although, it has been found that the construction and arrangement described hereinabove have been very satisfactory and effective in operation. It will be understood that the number of beacon lamps 12 may be varied from the number shown and described, it being preferred that the beams of light emitted from these lamps combine to give a 360° horizontal coverage and include at least one lamp emitting a beam of light projecting rearwardly from the aircraft along the longitudinal axis thereof while other of these lamps project beams of light laterally from either side of the aircraft.

When the lighting system of Figure 1 is in operation on an aircraft, flying during the night, air or ground observers will see the following flashing sequences: looking at the front of the aircraft, the front red beacon axis lamp will be seen flashing off alternately with the flashing red and green wing tip lights; looking at the rear of the aircraft, the rear red beacon axis lamp will be seen flashing off alternately with the flashing white tail light; looking at the left side of the aircraft, the left red beacon side lamps will be seen flashing off simultaneously with the red wing tip light and white tail light; and looking at the right side of the aircraft, the right green beacon side lamps will be seen flashing off simultaneously with the green wing tip light and the white tail light. By virtue of this novel flashing sequence it will be possible to determine, accurately and rapidly, the speed, position, and direction of flight of the aircraft.

Other embodiments of the beacon light assembly 10 of Figure 1 are illustrated in Figures 2–4, wherein like reference numerals have been used to designate like parts. Referring to the embodiment illustrated in Figure 2, this beacon light assembly is generally indicated at 10' and comprises a cover glass 14' and beacon lamps 12' intended to be arranged on the aircraft in the same manner as the beacon assembly 10 of Figure 1. The cover glass 14' may also have streamlined, oval shape, completely enclosing the beacon lamps 12' which preferably are of the type known as seal-beam units and include a frusto-conical reflecting surface 16', a parabolic lens 17' and a filament 18'. The filaments 18' are all positioned at the focal point of each unit whereby the lens 17' and reflecting surface 16' cooperate therewith to emit a beam of light being substantially of uniform transverse sectional area. That is to say, the beacon lamps 12' emit beams of light that do not diverge appreciably, and it is therefore necessary that these beams of light be refracted through a suitable angle by the cover glass 14' so as to combine and produce a full and continuous 360° horizontal coverage from the beacon assembly. To effect this refraction, the inner surface of the cover glass 14' preferably is formed with vertical flutes 15' of equal size and uniformly spaced along the interior of the cover glass, for refracting the beams of light from lamps 12' through an angle of 60° whereby they can combine to give a 360° horizontal coverage. In lieu of the flutes 15', the inner surface of the cover glass may be formed with vertically extending V-shaped grooves or the like to serve this purpose. Part of the cover glass 14', on the right side thereof as viewed in Figure 2, may be colored green for the beacon lamps on the same side of the aircraft as the green wing tip light 50 while the remaining portion of the cover glass may be colored red so that the beacon axis lamps and the other beacon side lamps will emit beams of light of the same color as the red wing tip light 40 on the left side of the aircraft; or, the cover glass 14' may be colored red throughout the entire perimeter thereof. The beacon lamps 12' of the Figure 2 embodiment are intended to be electrically connected to a battery (not shown) in the same relationship to each other and to the wing tip and tail lights as were the beacon lamps 12 of Figure 1, for effecting an identical flashing sequence.

In the embodiment of the beacon light assembly illustrated in Figures 3 and 4, a plurality of beacon lamps 12" are mounted in a stationary position on the front or nose of the fuselage and a beacon lamp 12" is mounted in a stationary position along the longitudinal axis of the aircraft at the rear thereof. These beacon lamps 12" may either be of the type illustrated in Figure 1 or of the type illustrated in Figure 2. If the latter type is used, a refracting lens 14" (see Figure 4) will have to be employed to spread the beams of light emitted from these lamps, through a 60° angle. The lens 14" preferably is convex, having a smooth external surface and a plurality of equally spaced, vertically extending flutes 15" or the like on the inner surface thereof. A positioning means 20" may be provided on lens 14" for the lamps 12", such means including an annular portion 22" adapted to engage the periphery of lens 14", spring fingers 24" depending from annular portion 22" and adapted to be snapped over a circumferential bead 19" on each lamp 12", whereby the lamp will be properly positioned with respect to lens 14".

Beacon lamps 12" may also be positioned along the sides of the aircraft, intermediate the wing and tail assembly, while the usual wing tip lights 40, 50 and tail light 30 are also provided. The beacon lamps 12", at the front of the aircraft, are arranged so that one of these lamps projects a horizontal beam forwardly from the aircraft along an extension of the longitudinal axis thereof, while two of such lamps are disposed on either side of the longitudinal axis to project horizontal beams laterally from the aircraft. The lenses 14" for the front beacon axis lamp and the beacon lamps on the left or port side of the aircraft are preferably colored red to impart a red color to the beams emitted from these lamps which will be the same as the wing tip light on this side of the aircraft. The rear beacon lamp 12" emits a narrow horizontal beam rearwardly of the aircraft along an extension of the longitudinal axis thereof, and the beacon lamps 12" on the side of the aircraft, rearward of the wing, will also emit narrow horizontal beams of light projecting laterally from the aircraft. The lens 14" for the rear beacon lamp 12" preferably is colored red; while the side lamps 12" rearward of the wing have their lenses colored to correspond to the color of the wing tip lights.

In this embodiment of the invention, it will be noted that there are six beacon side lamps and two beacon axis lamps which are all connected to a battery (not shown) and to the wing tip and tail lights in the same manner as the beacon lamps of Figures 1 and 2; i.e., the front and rear beacon axis lamps will flash off when the wing tip lights, the tail light and all the beacon side lamps are burning, and all of the beacon side lamps and the wing tip and tail lights will flash off when the beacon axis lamps are burning.

If desired, other color combinations and flashing sequences than those described may be employed for the various beams of light emitted from the beacon lamps and wing tip and tail lights. For example, these lamps and lights in the various embodiments described hereinabove may be arranged so that they all flash together, or the tail light may be arranged to emit a red beam of light. Additionally, individual stationary stroboscopic lamps may be substituted for the beacon lamps 12, 12' and 12", to give a high intensity, intermittent or periodic flash of light from each lamp.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. An aircraft beacon light assembly comprising a plurality of beacon lamps; each of said lamps being mounted on an aircraft to emit a stationary beam of light; a first pair of said lamps being arranged to emit oppositely directed, horizontal beams of light substantially aligned with the longitudinal axis of the aircraft; a second pair of said lamps being arranged to emit horizontal beams of light projecting from opposite sides of the aircraft at an angle to the longitudinal axis thereof; a third pair of said lamps being arranged to emit horizontal beams of light projecting from opposite sides of the aircraft intermediate the beams emitted by the first and second pairs of said lamps; and means for automatically periodically extinguishing and relighting said first pair of lamps alternately with periodic and simultaneous extinguishing and relighting of said second and third pairs of lamps.

2. The assembly defined in claim 1 wherein each of the beams from the beacon lamps defines a 60° horizontal angular spread whereby the combined horizontal spread of the beacon light assembly is 360°.

3. An aircraft beacon assembly comprising a plurality of beacon lamps disposed substantially along the longitudinal axis of an aircraft; a light transmitting cover glass for said lamps; said lamps being arranged in a circle within said cover glass and being substantially equally spaced along the circumference of the circle; each of said lamps being adapted to emit a stationary horizontal beam of light projecting in a radial direction outwardly from the circle; two of said beams being aligned with the longitudinal axis of the aircraft and the other of said beams being inclined at an angle to said axis and on either side thereof, and means for automatically extinguishing and relighting said two of said beams alternately with periodic and simultaneous extinguishing and relighting of said other of said beams.

4. The assembly defined in claim 3 wherein said means includes an electric circuit having the two lamps emitting the beams aligned with the aircraft longitudinal axis and the other lamps electrically connected in separate parallel branches; and a source of electrical energy in said circuit for said lamps; and means for periodically opening and closing each of the parallel branches.

5. The assembly defined in claim 4 wherein the means for periodically opening and closing the parallel branches comprises a normally closed switch for each branch and a single cam associated with said switches and having circumferentially spaced lobes thereon, said lobes being adapted to engage and open said switches alternately, an electric motor having a shaft connected to said cam.

6. An aircraft signalling system comprising a plurality of beacon lamps mounted on an aircraft fuselage, a light on the tail of the aircraft and a light on each wing tip of the aircraft; each of said beacon lamps and said lights being constructed and arranged to emit a stationary beam of light; at least one of said beacon lamps being adapted to emit a horizontal beam of light aligned with the longitudinal axis of the aircraft and projecting rearwardly thereof; other of said beacon lamps being adapted to emit horizontal beams of light disposed at an angle to the longitudinal axis of the aircraft; means for electrically connecting said lights to a source of electrical energy; and means for periodically extinguishing and relighting said one of said beacon lamps alternately with periodic and simultaneous extinguishing and relighting of said other of said beacon lamps and said wing tip and tail lights.

7. The signalling system defined in claim 6 wherein another of the beacon lamps is adapted to emit a horizontal beam of light aligned with the longitudinal axis of the aircraft and oppositely directed from the beam of the one beacon lamp; said another beacon lamp being extinguished and relighted simultaneously with said one beacon lamp, and further wherein said means includes: a first switch for said one and said another of said beacon lamps; a second switch for said other beacon lamps and said wing tip and tail lights; cam means for operating said switches; and a motor having a shaft drivingly connected to said cam means.

8. The signalling system defined in claim 7 wherein the one beacon lamp is arranged at the rear of the aircraft, and wherein some of the other beacon lamps are arranged at the front of the aircraft.

9. The signalling system defined in claim 7 wherein the beacon lamps are disposed substantially along the longitudinal axis of the aircraft and are arranged in juxtaposed relation in a closed curve, said beacon lamps facing outwardly of said curve, a light transmitting cover glass enclosing said beacon lamps, and said beacon lamps and said cover glass cooperating to produce a 360° horizontal angular distribution of the beams emitted by said beacon lamps.

10. The signalling system defined in claim 9 wherein the closed curve is a circle and wherein there are six beacon lamps equally spaced along the circumference of this circle; the beam of light emitted from each of said beacon lamps defining a 60° horizontal angular spread.

11. The signalling system defined in claim 9 wherein each of the beacon lamps emits a beam of light of substantially uniform transverse section; and wherein the cover glass comprises a smooth outer surface and an inner surface provided with equally-spaced vertical grooves whereby each of the latter beams will be refracted in passing through said cover glass to define a 60° horizontal angular spread.

12. An aircraft signalling system comprising a plurality of beacon lamps mounted on an aircraft fuselage; a position light on the tail of the aircraft; and a position light on each wing tip of the aircraft; each of said beacon lamps and said lights being constructed and arranged to emit a stationary beam of light; a first pair of said beacon lamps being adapted to emit oppositely directed horizontal beams of light aligned with the longitudinal axis of the aircraft; a second pair of said beacon lamps being adapted to emit oppositely directed beams of light disposed at an angle to the longitudinal axis of the aircraft; an electrical circuit for connecting all of said lamps and said lights to a source of electrical energy; a first parallel branch in said circuit for said first pair of beacon lamps, a second parallel branch for said second pair of beacon lamps, a third parallel branch for said wing tip lights, and a fourth parallel branch for said tail lights; and means associated with said parallel branches for periodically flashing said second pair of beacon lamps simultaneously with said wing and tail lights and alternately with periodic flushing of said first pair of beacon lamps.

References Cited in the file of this patent

UNITED STATES PATENTS

| | | |
|---|---|---|
| 1,320,308 | Balsch | Oct. 28, 1919 |
| 1,718,850 | Bowen | June 25, 1929 |
| 2,017,052 | Barton | Oct. 15, 1935 |
| 2,365,038 | Adler | Dec. 12, 1944 |
| 2,478,908 | Edgerton | Aug. 16, 1949 |
| 2,577,296 | Alles | Dec. 4, 1951 |
| 2,748,371 | Wilcox | May 29, 1956 |